United States Patent
Park et al.

[19]

[11] Patent Number: 6,154,652
[45] Date of Patent: Nov. 28, 2000

[54] DEVICE AND METHOD FOR PERFORMING HANDOFF IN MOBILE COMMUNICATION SYSTEM

[75] Inventors: Su-Won Park, Seoul; Hyun-Jung Mun, Kyonggi-do, both of Rep. of Korea

[73] Assignee: Samsung Electronics Co., Ltd., Rep. of Korea

[21] Appl. No.: 09/206,056

[22] Filed: Dec. 4, 1998

[30] Foreign Application Priority Data

Dec. 4, 1997 [KR] Rep. of Korea ........................ 97-65962
Apr. 4, 1998 [KR] Rep. of Korea ........................ 98-11996
Nov. 30, 1998 [KR] Rep. of Korea ........................ 98-51889

[51] Int. Cl.$^7$ ............................................. H04Q 7/20
[52] U.S. Cl. .................... 455/437; 455/515; 455/38.1; 455/38.2; 455/38.3; 370/280; 370/294; 370/331; 370/337; 370/347; 370/503; 370/510; 370/528
[58] Field of Search .................. 455/434, 437, 455/515, 38.1, 38.2, 38.3; 370/331, 337, 347, 280, 294, 503, 510, 528

[56] References Cited

U.S. PATENT DOCUMENTS 5,732,076 3/1998 Ketseoglou et al. .................... 370/347
5,818,829 10/1998 Raith et al. ............................. 370/347
5,862,452 1/1999 Cudak et al. ............................ 455/6.3
5,951,709 9/1999 Tanaka ..................................... 714/755
5,987,010 11/1999 Schnizlein .............................. 370/280
5,995,515 11/1999 Suzuki ..................................... 370/465
6,049,538 4/2000 Scott ....................................... 370/347

*Primary Examiner*—Curtis A. Kuntz
*Assistant Examiner*—Barry W. Taylor
*Attorney, Agent, or Firm*—Dilworth & Barrese

[57] ABSTRACT

A mobile communication system transmitting data in frame unit includes a base station apparatus and a terminal apparatus. The transmitter has a controller having consecutive first and second frames each divided into a first interval and a second interval following the first interval. In a handoff mode, the controller transmits respective frame data in the first interval of the first frame and the second interval of the second frame and stops transmission of the data in the second interval of the first frame and the first interval of the second frame. Further, the terminal apparatus (i.e., mobile station) includes a receiver for processing received data, a handoff determiner for determining a handoff target base station by analyzing a strength of the received signal, and a controller applying to the receiver a signal transmitted from a present base station in the first interval of the first frame and the second interval of the second frame and applying to the handoff determiner signals transmitted from other base stations in the second interval of the first frame and the first interval of the second frame.

62 Claims, 11 Drawing Sheets

DEVICE AND METHOD FOR PERFORMING HANDOFF IN MOBILE COMMUNICATION SYSTEM

BACKGROUND OF THE INVENTION

1. Field of the Invention

The present invention relates to a mobile communication system, and in particular, to a device and method for performing handoff in a mobile communication system.

2. Description of the Related Art

In a mobile communication system, there are several handoff methods for maintaining a call when a terminal (or mobile station) moves from a present cell (or base station) area to an adjacent cell area. One is a soft handoff method and another is a hard handoff method. In the soft handoff, the terminal communicates by using a channel allocated from a handoff target base station to which the terminal is to be handed off as well as a channel allocated from the present base station which presently services the terminal, and then disconnects one of the channels, whose channel quality is lower than a threshold value. In the hard handoff, when call quality is lower than a threshold level, the terminal first disconnects the channel allocated from the present base station and then attempts to connect with the adjacent base station. Furthermore, there is another handoff method in which upon receipt of a handoff request message, the base station transmits data for an interval shorter than a predetermined interval by increasing a data rate based on an engagement made between the base station and the terminal, and the terminal then receives the data for the above short interval and searches for an adjacent base station for the remaining interval. This handoff method is illustrated in FIG. 1.

FIG. 1 shows a state where a terminal (i.e., mobile station) moves from a present base station BS#0 to an adjacent base station BS#1 (i.e., handoff target base station BS#1 to which the terminal is to be handed off). In this situation, the terminal perceives that the strength of a signal received from the present base station BS#0 is getting lower, while the strength of a signal received from the adjacent base station BS#1 is getting higher. In the meantime, when the strength of the signal received from the base station BS#0 is lower than a threshold level, the terminal transmits a handoff request message or a detected signal strength value to the current base station BS#0, and the base station BS#0 then divides the transmission frame cycle into a transmission interval Ton and a non-transmission interval Toff to transmit the entire frame data for the transmission interval Ton. Then, the terminal receives the signal from the base station BS#0 for the transmission interval Ton and receives the signal received from the adjacent base station BS#1 for the non-transmission interval Toff, to thereby perform handoff.

The technical terminologies used in the specification will be defined herein below. The term "mode 0" (e.g., a base station transmission mode 0 or a terminal reception mode 0) refers to a mode in which the base station normally transmits the data for the entire frame cycle and the terminal correspondingly receives the transmitted data. The term "mode 1" (e.g., a base station transmission mode 1 or a terminal reception mode 1) refers to a mode in which the base station transmits the entire data for a predetermined interval of the frame cycle and the terminal receives the transmitted data for the corresponding interval (i.e., the above predetermined interval). The term "mode 2" (e.g., a base station transmission mode 2 or a terminal reception mode 2) refers to a mode in which the base station does not transmit the data for a predetermined interval of the frame cycle and the terminal searches for an adjacent base station for the predetermined interval. Here, a guard time required in switching from mode 1 to mode 2 is represented by "a", and a guard time required in switching from mode 2 to mode 1 or mode 0 is represented by "b". Moreover, in dividing the frame cycle, reference character D1 denotes a leading interval of the frame and reference character D2 denotes a following interval of the frame. Reference character Ton denotes a data transmission interval for which the base station transmits the data to the terminal, and reference character Toff denotes a data non-transmission interval for which the base station stops transmission of the data to the terminal. Further, the term "first frame" refers to a frame transmitted primarily from the base station to the terminal at the handoff request, and the term "second frame" refers to a frame transmitted from the base station to the terminal in succession to the first frame.

Now, reference will be made to a conventional handoff method with reference to FIGS. 2 and 3. FIG. 2 is a diagram illustrating the relationship between the frame cycles and the base station transmission powers (or the terminal reception powers) during handoff in a conventional mobile communication system. In FIG. 2, reference character T denotes one frame cycle, reference character "a" denotes a guard time required in switching from the base station transmission mode 1 (or terminal reception mode 1) to the base station transmission mode 2 (or terminal reception mode 2, reference character "b" denotes a guard time required in switching from the base station transmission mode 2 (or terminal reception mode 2) to the base station transmission mode 1 (or terminal reception mode 1), and reference character "S" (i.e., S/2+S/2) denotes an actual search time for which the terminal searches for the adjacent base station over two frame cycles 2T. In FIG. 2, the time S can be expressed by S=2×(Toff−a−b)=2Toff−2a−2b. As illustrated, in the conventional handoff method, the base station transmits the data for the transmission interval Ton=T/2 out of one frame cycle and stops transmission of the data for the non-transmission interval Toff=T/2.

When the base station transmits the data as shown in FIG. 2 in a handoff mode, the terminal performs handoff according to the procedure shown in FIG. 3.

Referring to FIG. 3, the terminal receives and processes the frame data transmitted normally from the base station (step 310). In this state, the terminal transmits a handoff request message to the base station, if it is determined that handoff is required, for example, due to the reduced strength of the signal received from the base station. The base station then informs the terminal of the handoff, successively transmits the data at a double data rate for the leading half cycle T/2 of the frame cycle T, and stops transmitting the data for the following half cycle T/2. Then, the terminal senses, in step 312, that the handoff is initiated, and receives the data of double data rate for the leading half cycle T/2 of the frame cycle T (step 314). The relation between the leading half cycle T/2, for which the terminal receives the data, and the base station transmission power is represented by reference numeral 200 in FIG. 2. Thereafter, the terminal searches for the adjacent base station, to which the terminal is to be handed off, for the following half cycle T/2 (step 316). Actually, however, the terminal does not search for the adjacent base station for the whole remaining half cycle T/2, but for the time obtained by subtracting a guard time "a" and a guard time "b" from the following half cycle T/2, wherein the guard time "a" is a time required in switching from the base state transmission mode 1 (or terminal reception mode 1) to the base station transmission mode 2 (or the terminal reception mode 2) and the guard time "b" is a time required in switching from the base station transmission mode 2 (or terminal reception mode 2) to the base station transmission mode 1 (or terminal reception mode 1). Accordingly, the actual time for which the base station searches for the adjacent base station is S/2=T/2−a−b. The relation between the actual search cycle and the base station transmission power is represented by reference numeral 210 in FIG. 2.

In the meantime, the cellular terminal determined whether the adjacent base station is detected (i.e., whether a signal is detected from the adjacent base station) (step 318). When the signal is detected from the adjacent base station, the cellular terminal is handed off to the adjacent base station in step 320. After completion of the handoff, the terminal returns to step 310 and continues to normally receive the data. However, upon failure to detect the signal transmitted from the adjacent base station in step 318, the terminal returns to step 314 to receive the data for the following half cycle T/2 of the next frame cycle. Here, the relation between the respective half cycles for the next frame and the transmission powers are represented by reference numerals 220 and 230 in FIG. 2.

As stated above, although a theoretical time available for the adjacent base station search is 2Toff, the actual time S available for the adjacent base station search is S=2Toff−2a−2b. That is to say, as can be appreciated from FIG. 2, the reception mode 2 follows the reception mode 1 with a time delay "a", and the reception mode 1 or 0 also follows the reception mode 2 with a time delay "b", thereby reducing the actual search time by the guard time required in switching the modes.

That is, in the conventional handoff method, operations of transmitting the data and searching for the adjacent base station are repeated until the adjacent base station to which the terminal is to be handed off is detected, which wastes the guard time required in switching the transmission/reception modes. The waste of the guard time will reduce the actual search time for which the terminal searches for the adjacent base station. Furthermore, the frequency mode switching overloads both the base station and the terminal.

SUMMARY OF THE INVENTION

It is therefore an object of the present invention to provide a handoff device and method capable of effectively allocating a transmission interval and a non-transmission interval of a transmission frame at the handoff request, to increase an actual search time for which a terminal searches for an adjacent base station.

It is another object of the present invention to provide a handoff device and method capable of effectively allocating a transmission interval and a non-transmission interval of a transmission frame at the handoff request, to prevent the waste of a guard time due to the frequency mode switching.

It is still another object of the present invention to provide a handoff device and method capable of effectively allocating a transmission interval and a non-transmission interval of a transmission frame at the handoff request, to reduce an overload due to the frequent mode switching.

It is yet another object of the present invention to provide a handoff device and method for variably allocating a transmission interval and a non-transmission interval of a transmission frame at the handoff request.

To achieve the above object, there is provided a mobile communication system transmitting data in frame unit, including a base station apparatus and a terminal apparatus. The transmitter comprises a controller having consecutive first and second frames each divided into a first interval and a second interval following the first interval. In a handoff mode, the controller transmits respective frame data in the first interval of the first frame and the second interval of the second frame and stops transmission of the data in the second interval of the first frame and the first interval of the second frame. The terminal apparatus (i.e., mobile station) comprises a receiver for processing received data, a handoff determiner for determining a handoff target base station by analyzing the strength of the received signal, and a controller applying to the receiver a signal transmitted from a present base station in the first interval of the first frame and the second interval of the second frame, and applying to the handoff determiner signals transmitted from other base stations in the second interval of the first frame and the first interval of the second frame.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings.

DETAILED DESCRIPTION OF PREFERRED EMBODIMENTS

A preferred embodiment of the present invention will be described herein below with reference to the accompanying drawings. In the following description, well known functions or constructions are not described in detail since they would obscure the invention in unnecessary detail.

In a mobile communication system according to the present invention, a base station apparatus has consecutive first and second frames each divided into a first interval and a second interval following the first interval. The base station transmits frame data in the first interval of the first frame and the second interval of the second frame, and stops transmission of the frame data in the second interval of the first frame and the first interval of the second frame. Further, a terminal apparatus receives and processes the transmitted frame data in the first interval of the first frame and the second interval of the second frame, and receives signals from other base stations in the second interval of the first frame and the first interval of the second frame, to search for a handoff target base station to which the terminal is to be handed off.

That is, the first interval of the first frame and the second interval of the second frame are data transmission intervals, and the second interval of the first frame and the first interval of the second frame are data non-transmission intervals. Furthermore, the first and second intervals for which communication parameters are interchanged between the base station and the terminal, can be variably controlled. In the following description, it is assumed that the first and second intervals each are a half cycle of one frame cycle. The first interval refers to a leading interval and the second interval refers to a following interval.

In addition, the term "handoff mode" refers to a mode where the terminal searches for the handoff target base station and is then handed off to the searched target base station, at a handoff request from the base station or the terminal itself. A term "normal mode" refers to a mode where the base station normally transmits the data for the entire frame cycle.

Figure 1:
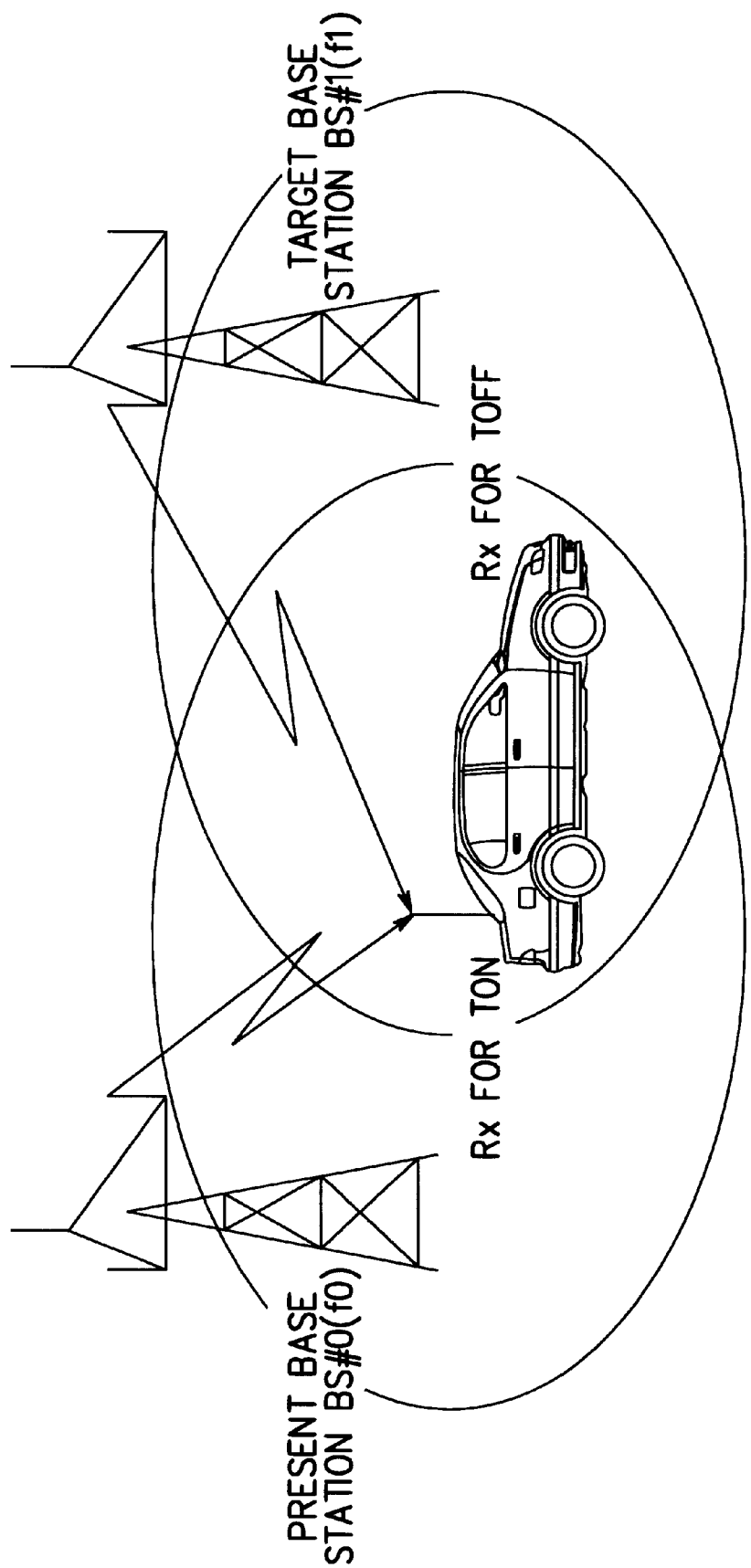
FIG. 1 is a diagram for explaining a handoff procedure in a mobile communication system.
Figure 2:
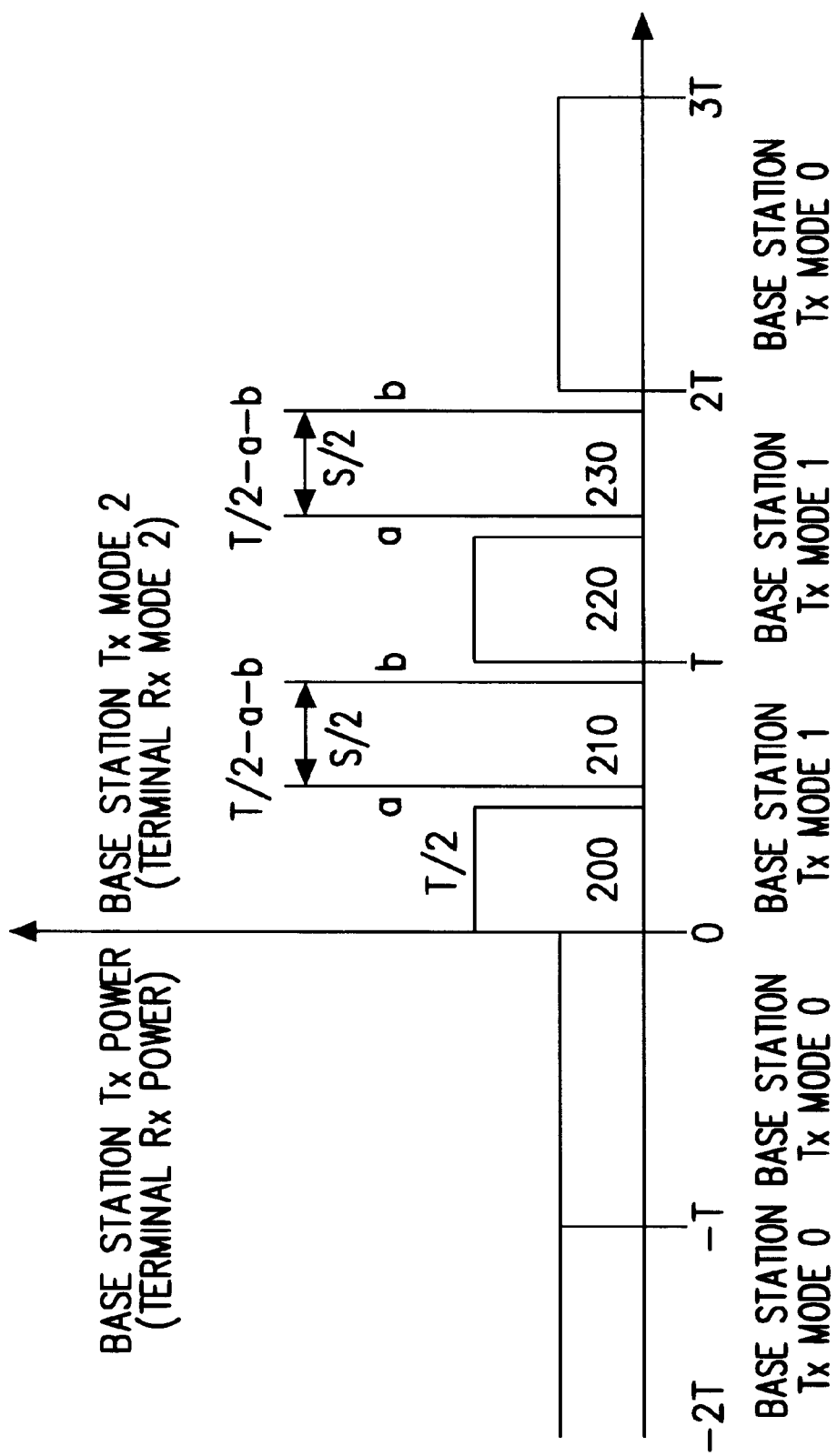
FIG. 2 is a diagram illustrating the relationships between transmission frames and base station transmission powers in a conventional mobile communication system.
Figure 3:
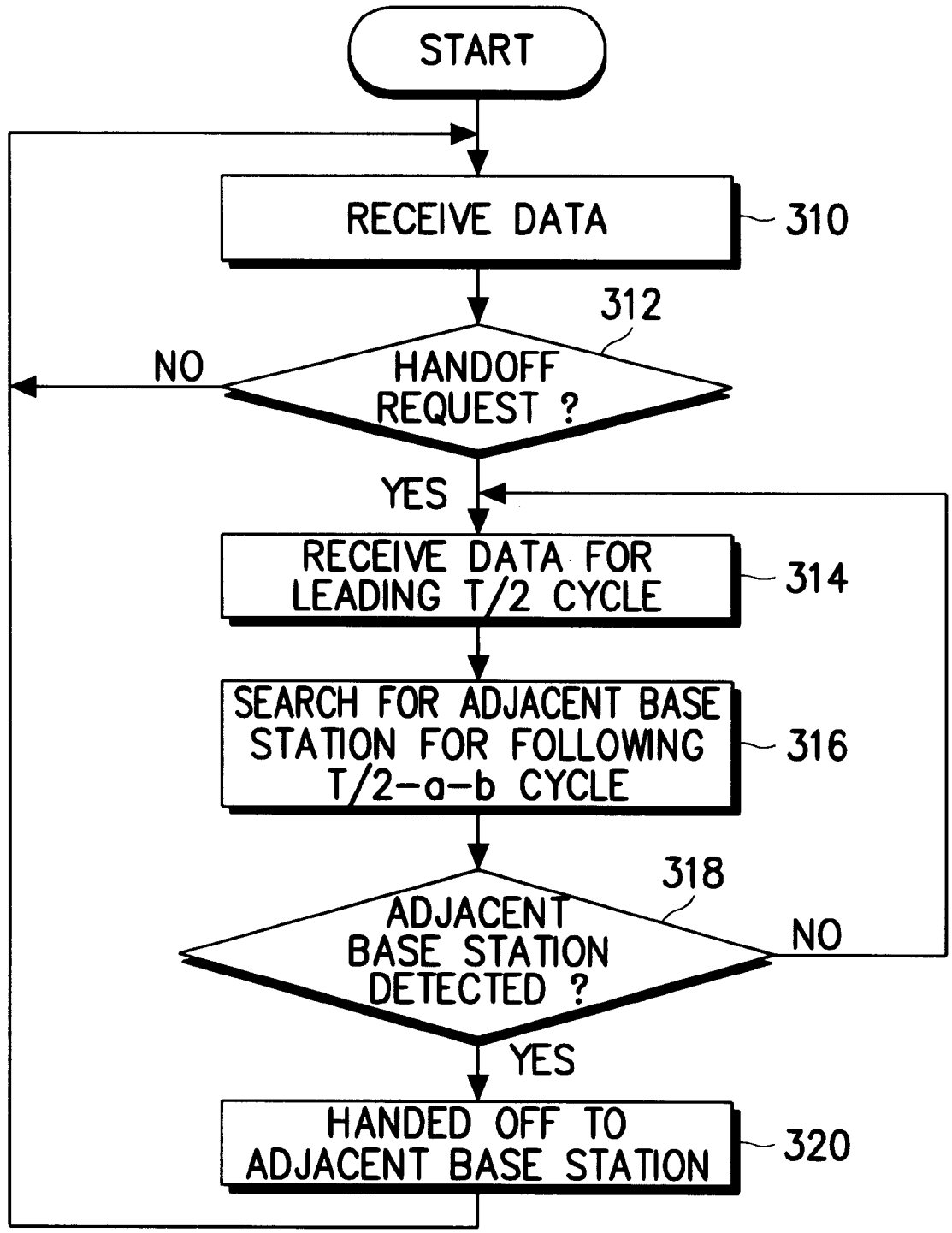
FIG. 3 is a flowchart illustrating a handoff procedure performed in a terminal of the conventional mobile communication system.
Figure 4:
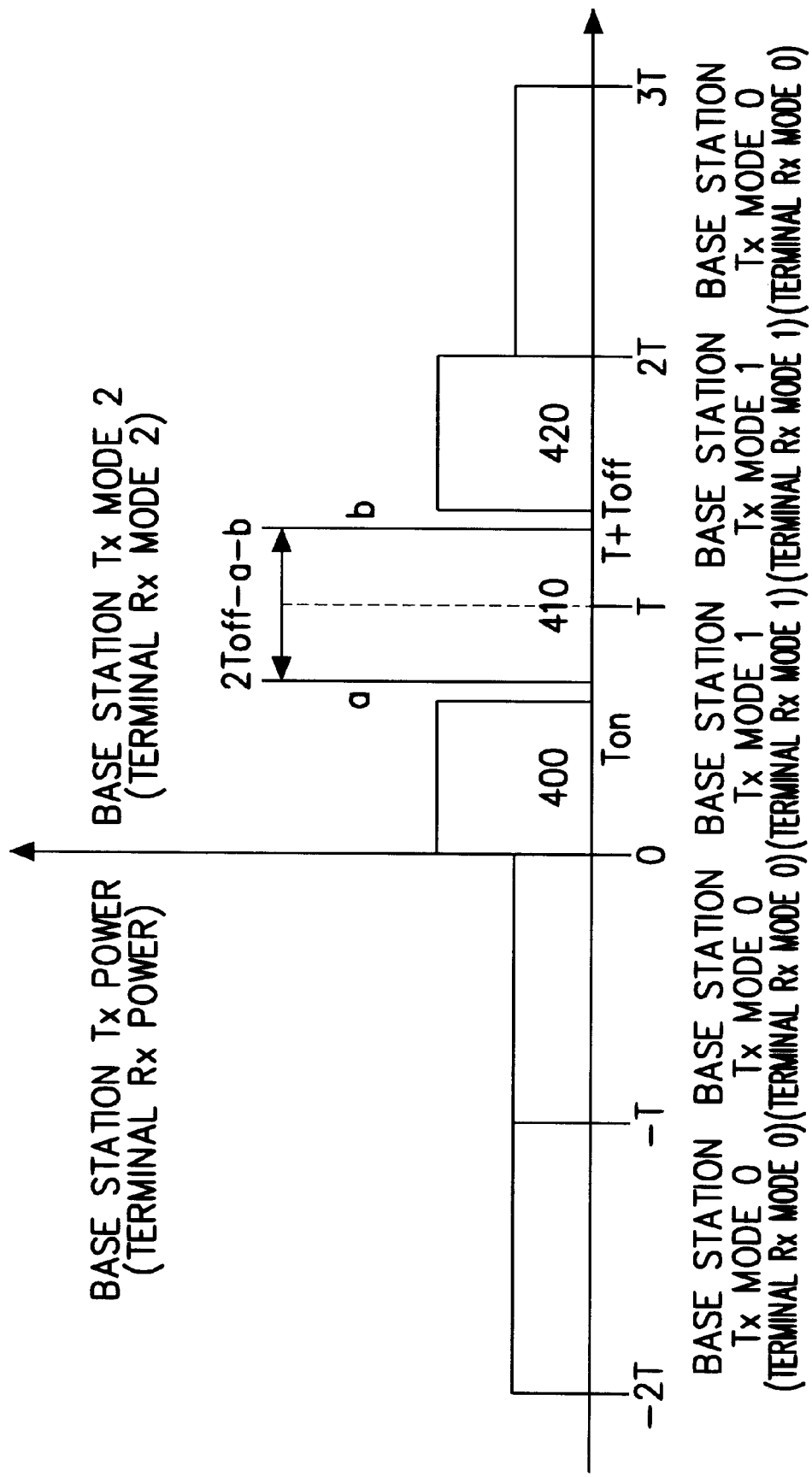
FIG. 4 is a diagram illustrating the relationships between transmission frames and base station transmission powers in a mobile communication system according to an embodiment of the present invention.

FIG. 4 illustrates the relationships between frame cycles and base station transmission powers (or terminal reception powers) in a mobile communication system according to an embodiment of the present invention. In FIG. 4, reference characters "T", "S", "a" and "b" are identical to those used in FIG. 2. In the handoff method according to the present invention, when the mobile communication system fails to end the handoff procedure in the following non-transmission interval of the first frame, it continues to perform the handoff procedure in the leading interval of the succeeding second frame, instead of transmitting the data. Therefore, as illustrated in FIG. 4, the actual search time available for the adjacent base station search is S=2Toff−a−b.

Therefore, in the novel handoff method, at the handoff request, the cellular terminal receives the data for the leading half cycle of one frame and then primarily searches for the adjacent base station for the following half cycle from which the necessary guard time "a" is subtracted. When the cellular terminal fails to search for the adjacent base station in the primary search, it continues to secondarily search for the adjacent base station for the leading half cycle of the next frame, from which the necessary guard time "b" is subtracted.

The handoff method of the cellular terminal comprises the steps of: determining whether the handoff request is made or not; receiving the data for the leading half cycle of one frame in response to the handoff request; switching a mode for a first guard time, after completion of the data reception; searching for an adjacent base station for the following half cycle of a first frame from which the first guard time is subtracted and the leading half cycle of a second frame from which a second guard time is subtracted; and switching the mode for the second guard time and receiving the data, after searching for the adjacent base station.

In the embodiment, the data transmission interval Ton and the data non-transmission interval Toff of the base station shall not be limited to the half cycle of the frame, rather, they may be variable.

Figure 5:
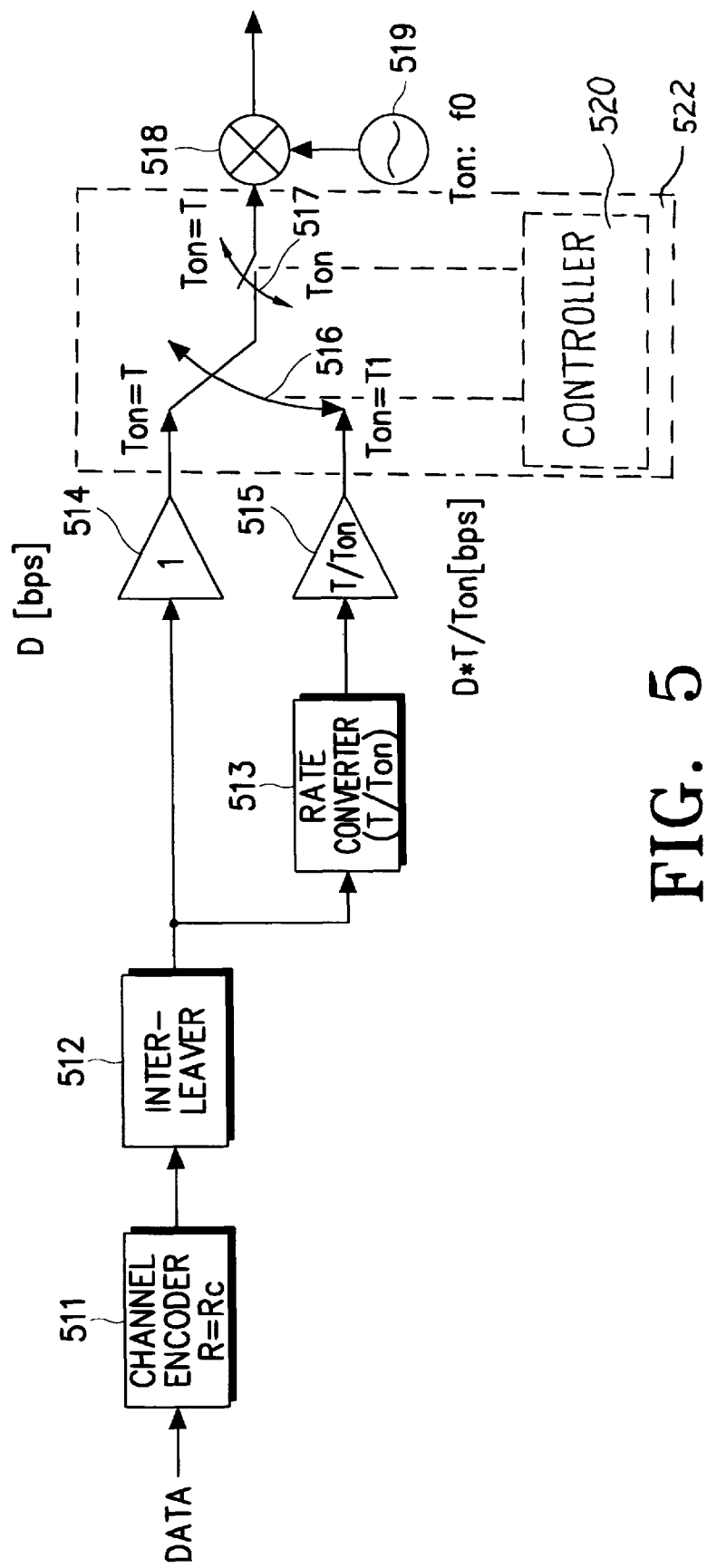
FIG. 5 is a schematic block diagram of a handoff scheme for a base station according to an embodiment of the present invention.
Figure 6:
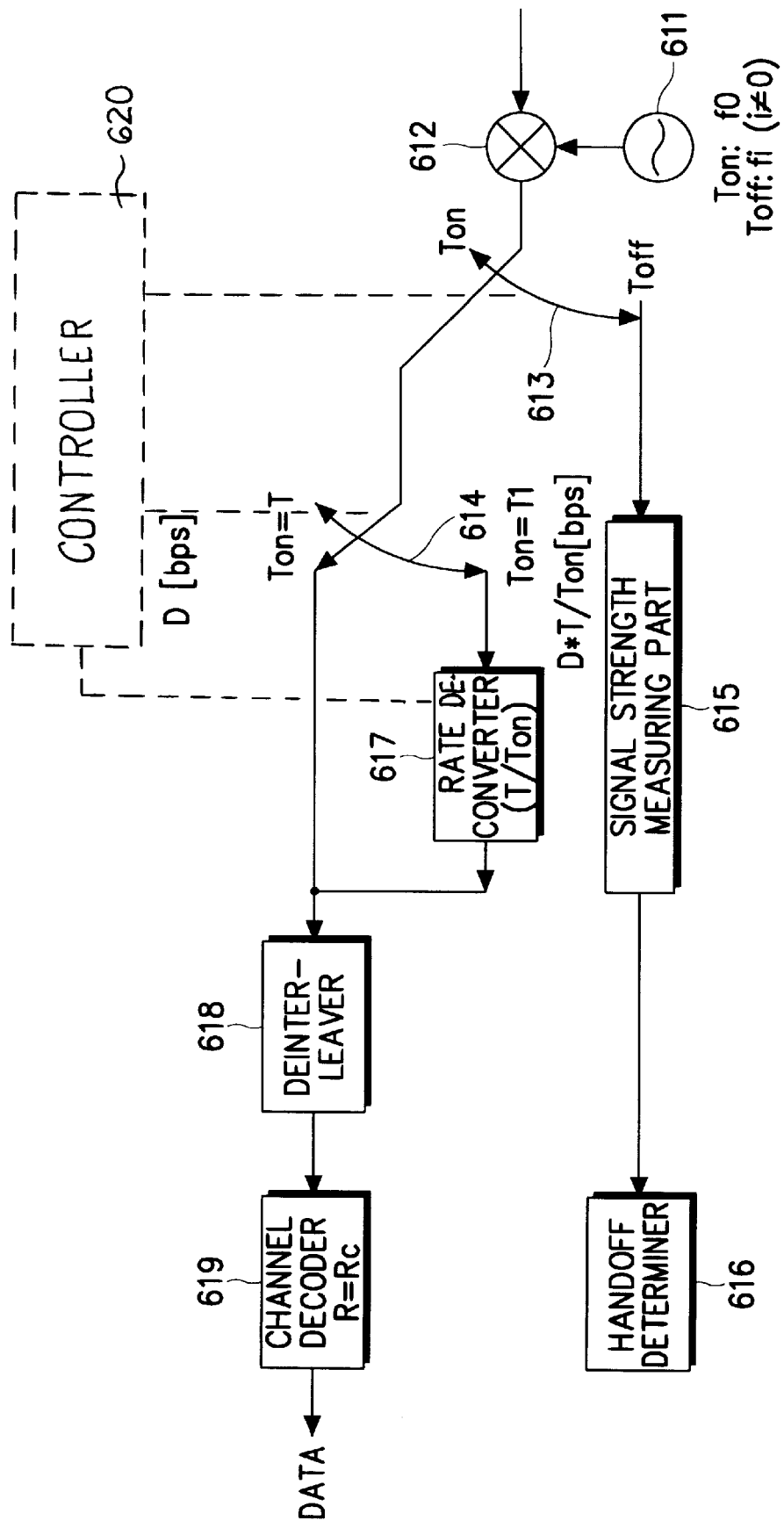
FIG. 6 is a schematic block diagram of a handoff scheme for a terminal according to an embodiment of the present invention.

FIGS. 5 and 6 illustrate a handoff scheme for the base station and a handoff scheme for the terminal according to an embodiment of the present invention, respectively.

Referring to FIG. 5, a channel encoder 511 encodes input data into symbol data at a coding rate R=Rc. An interleaver 512 interleaves the symbol data output from the channel encoder 511. A rate converter 513 converts (or increases) a data rate of the symbol data output from the interleaver 512 by T/Ton times. A first amplifier 514 amplifies the symbol data output from the interleaver 512 with a specific gain, and a second amplifier 515 amplifies the symbol data output from the rate converter 513 with a specific gain. Here, the symbol data input to the first amplifier 514 is the normal frame data for the mode 0, and the symbol data input to the second amplifier 515 is the rate converted frame data for handoff. Accordingly, in order to compensate for a bit error rate (BER) which increases with the data rate, the gain of the second amplifier 515 is set higher than that of the first amplifier 514, in proportion to the converted data rate.

A first switch 516 is switched to the first amplifier 514 in a normal mode and to the second amplifier 515 in a handoff mode, under the control of a controller 520. That is, the first switch 516 transfers an output of the first amplifier 514 to a second switch 517 in the normal mode and an output of the second amplifier 515 to the second switch 517 in the handoff mode. The second switch 517 is turned on (or closed) in the normal operation mode. However, in the handoff mode, the second switch 517 is turned on in the transmission interval and turned off (or opened) in the non-transmission interval. That is, under the control of the controller 520, the second switch 517 switches between the transmission interval and the non-transmission interval of the frame, during data transmission in the handoff mode, and is turned on only in the transmission interval to transfer the data from the first switch 516 to a modulator 518. The modulator 518 modulates the data from the second switch 517 by using a carrier wave f0 of the base station itself, generated from an oscillator 519, and radiates the modulated signal through a undepicted antenna.

Here, the controller 520 and the first switch 516 and the second switch 517 correspond to a controller 522 for controlling a transmission operation of the base station.

In the case that the mobile communication system is a CDMA (Code Division Multiple Access) communication system, a transmitter in the base station apparatus is composed of the channel encoder 511, the interleaver 512, the rate converter 513, the amplifier 515, and the modulator 518. Here, the rate converter 513 may include orthogonal modulation and PN (Pseudo Noise) sequence spreading, and the amplifier 515 may be a gain controller. Further, the undepicted controller controls the rate converter 513 and the amplifier 515, in the handoff mode. That is, in the handoff mode, the controller uses a fast data transmission clock by controlling the rate converter 513, and controls the orthogonal modulation by using orthogonal codes of short length. In addition, the controller increases the gain of the amplifier 515 in the data transmission interval (i.e., the first interval of the first frame and the second interval of the second frame) to provide a transmission power higher than that in the normal mode, and disables the amplifier 515 in the data non-transmission interval (i.e., the second interval of the first frame and the first interval of the second frame).

Next, referring to FIG. 6, a mixer (or demodulator) 612 demodulates a signal received via an undepicted antenna by using a carrier wave f0 or fi (where I≠0) of a corresponding base station, generated from an oscillator 611. Specifically, when the signal is received from the present base station, the mixer 612 demodulates the received signal using the carrier wave f0, and when the signal is received from the adjacent base station, the mixer 612 demodulates the received signal using the carrier wave fi for the adjacent base station. A third switch 613 switches an output signal of the mixer 612 to a fourth switch 614 in a data reception interval Ton (or data transmission interval in the base station) and to a signal strength measuring part 615 in a data non-reception interval Toff (or non-transmission interval in the base station). The signal strength measuring part 615 detects the strength of the signal received from the adjacent base station in the non-transmission interval Toff. A handoff determiner 616 determines whether to perform the handoff operation depending upon the detected signal strength value of the adjacent base station, output from the signal strength measuring part 615. The fourth switch 614 switches to the mode 0 or the mode 1. Specifically, the fourth switch 614 switches the data received from the third switch 613 to a deinterleaver 618 in a normal data reception mode (i.e., mode 0) and to a rate deconverter 617 in a data reception mode (i.e., mode 1) for handoff. Here, the data switched to the deinterleaver 618 has a normal data rate and the data switched to the rate deconverter 617 has a data rate higher than that of the original data. The rate deconverter 617 deconverts the data rate of the received data from the fourth switch 614 to the original data rate. The deinterleaver 618 deinterleaves the data received from the fourth switch 614 and the rate deconverted data received from the rate deconverter 617. A channel decoder 619 decodes an output of the deinterleaver 618 at a decoding rate R=Rc.

In the case that the terminal apparatus of FIG. 6 is a CDMA terminal apparatus, a receiver in the terminal apparatus is composed of the demodulator 612, the switch 613, the rate deconverter 617, the deinterleaver 618, the channel decoder 619, the signal strength measuring part 615 and the handoff determiner 616. The controller 620 in the terminal controls the rate deconverter 617 and the switch 613. Here, the rate deconverter 617 may include orthogonal modulation and PN sequence spreading. Further, the controller 620 controls the switch 613 in the handoff mode to connect the output of the demodulator 612 to the rate deconverter 617 in the data transmission interval (i.e., the first interval of the first frame and the second interval of the second frame) and to the signal strength measuring part 615 in the data non-transmission interval (i.e., the second interval of the first frame and the first interval of the second frame). The rate deconverter 617 orthogonally despreads the data from the demodulator 612 by using the fast clock and the short orthogonal codes which are used in the base station apparatus, and stores the despread data in the deinterleaver 618. By reading the data stored in the deinterleaver 618 in frame units, it is possible to obtain the data deconverted to the original data rate.

Figure 7:
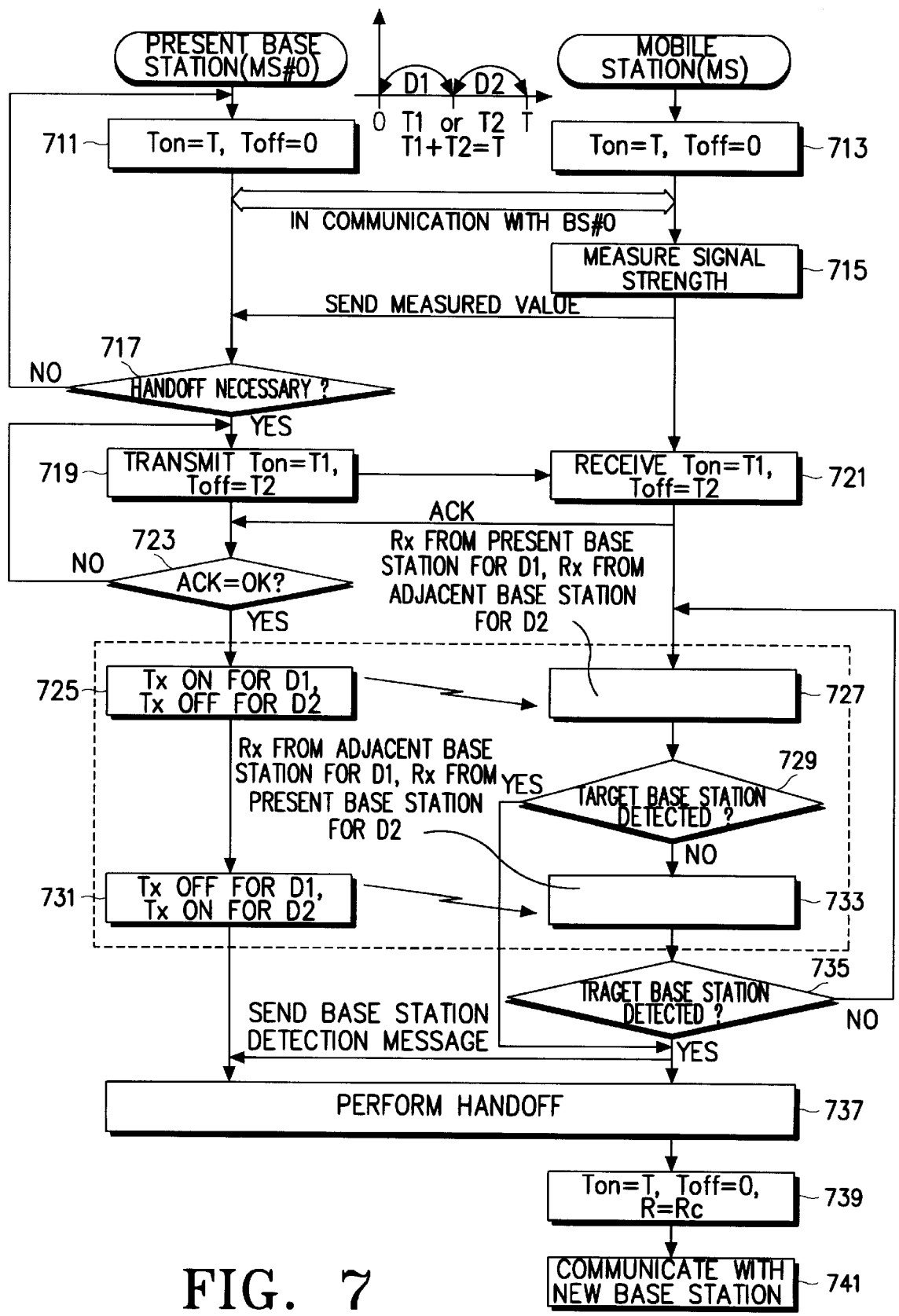
FIG. 7 is a flowchart illustrating a handoff procedure between the base station and the terminal according to an embodiment of the present invention.

FIG. 7 is a flowchart illustrating a handoff procedure between the base station and the terminal according to an embodiment of the present invention. Referring to FIG. 7, the present base station transmits the data for the whole frame cycle T in step 711, and the terminal (i.e., mobile station) receives the transmitted data for the whole frame cycle T in step 713. This operation corresponds to the mode 0 in which Ton=T and Toff=0. In step 715, the terminal measures the signal strength of the present base station and informs the base station of the detected signal strength value when it is lower than a threshold level. Based on the detected signal strength value, the base station determines whether to perform the handoff (step 717). When it is not necessary to perform the handoff, the base station returns to step 711 and continues to transmit the data in mode 0.

However, if it is necessary to perform the handoff, the present base station proceeds to step 719 to transmit the handoff parameters of Ton=T1, Toff=T2 and T1+T2=T. The terminal then receives the handoff parameters (step 721) and transmits an acknowledge signal ACK. The present base station checks whether the acknowledge signal ACK is received from the terminal (step 723). When the acknowledge signal ACK is not received for a predetermined time, the base station returns to step 719 to transmit the handoff parameters again.

However, when the acknowledge signal ACK is received in step 723, the base station proceeds to step 725 to transmit the frame data, whose data rate is increased by T/Ton times, for the Ton time in the leading interval D1 [0, Ton] of the frame and, the terminal receives the frame data in the leading interval D1 of the first frame (step 727). The relation between the data transmission interval Ton and the present base station transmission power (or terminal reception power) is represented by reference numeral 400 in FIG. 4, in which the transmission power is, as illustrated, increased by T/Ton times as compared with the case where the data is normally transmitted. Subsequently, the terminal measures the signal strength of the adjacent base station for the Toff time in the following interval D2 [Ton, T] of the first frame in step 729, to determine whether the handoff target base station is detected. Here, the terminal searches for the adjacent base station not for the whole Toff interval, but for an interval S=Toff−a, where "a" is the guard time required in switching from mode 1 to mode 2.

Here, if the handoff target base station is detected, the terminal sends a base station detection message to the present base station and is handed off to the detected target base station in step 737. However, when the target base station is not detected (step 729), the terminal proceeds to step 733. In the meantime, when the present base station does not receive the base sation detection message for a predetermined time after transmission of the first frame data, it stops transmitting the data for the time Toff in the leading interval D1 [T, T+Toff] of the second frame succeeding the first frame and instead, transmits the data of the increased data rate for the time Ton in the following interval D2 [T+Toff, 2T] of the second frame (step 731). The terminal then receives the frame data in step 733, and checks whether the handoff target base station is detected by measuring the signal strength of the adjacent base station for the Toff time in the leading interval D1 of the second frame (step 735).

Upon detection of the handoff target base station, the terminal sends the base station detection message to the present base station and is handed off to the detected target base station in step 737. However, when the terminal fails to detect the handoff target base station at step 735, it returns to step 727 to receive the next (i.e., second) frame data. After sending the base station detection message, the terminal resets the parameters for the normal mode, in such a manner that Ton=T, Toff=0 and R=Rc (step 739), and communicates with the new base station in step 741.

The relation between the transmission intervals and the associated transmission powers are represented by reference numerals 400 and 420, in which the transmission powers are, as illustrated, increased by T/Ton times as compared with the case where the data is normally transmitted. As a result, as illustrated in FIG. 4, the actual search time available for the adjacent base station search is 2Toff−a−b which is shorter by a+b than the conventional search time S=2Toff−2a−2b. That is to say, the terminal searches for the adjacent base station for the consecutive intervals between Ton and T of the present (i.e., first) frame and between T and T+Toff of the next (i.e., second) frame. Accordingly, it is possible for the terminal to reduce, by half, the frequency of switching between the mode 2 (in which the terminal searches for the adjacent base station) and the mode 1 (in which the terminal receives the data), which increases the search time available for the base station search and decreases the load of the frequent mode switching.

In FIG. 7, a description is made of a case where the terminal measures the strength of the received signal and sends the signal strength value to the present base station when the measured signal strength value is lower than the threshold level, and then the base station analyzes the signal strength value and sends the handoff request message to the terminal according to the analysis. However, it is also possible that the terminal analyzes the received signal strength and sends the handoff request message to the base station according to the analysis. That is, when the received signal strength becomes lower than the threshold level during the normal communication, the terminal sends the handoff request message to the base station and then performs the handoff operation, as illustrated in FIG. 4, according to the handoff parameters that the base station sends in response to the handoff request message.

Figure 8:
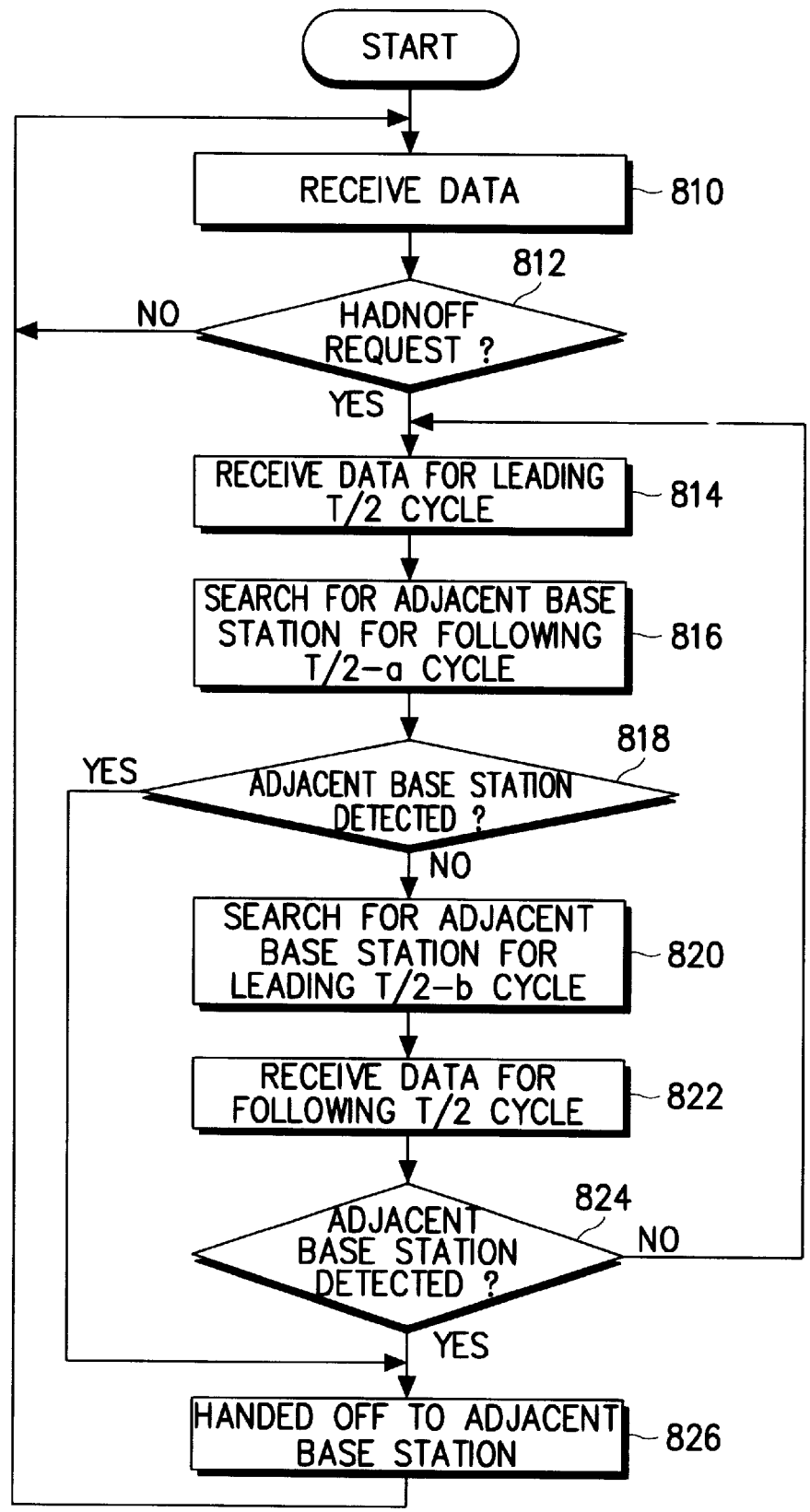
FIG. 8 is a flowchart illustrating a handoff procedure performed in the terminal.

FIG. 8 is a flowchart illustrating the handoff procedure performed in the terminal, when the data transmission and reception intervals for handoff are a half cycle T/2 of one frame.

Referring to FIG. 8, in steps 810 to 814, the terminal sends the handoff request message to the base station when the handoff operation is necessary during the normal data reception. In response to the handoff request message, the base station then transmits the data for the leading half interval of the first frame at the double data rate. The base station transmission power during the leading half interval of the first frame is represented by reference numeral 400 in FIG. 4. The terminal receives the data in the leading interval of the first frame (step 814), and searches for the adjacent base station for the following half cycle of the first frame (step 816). Here, the terminal searches for the adjacent base station not for the whole following half cycle, but for the following half cycle from which the guard time "a" required in switching from the transmission mode to the reception mode is subtracted. Therefore, the actual time available for the adjacent base station search is S/2=Toff−a.

In the meantime, the terminal determined whether a signal is detected from the adjacent base station (i.e., whether the adjacent base station is detected) (step 818). If it is determined that the adjacent base station is detected, the terminal is handed off to the new base station (step 826) after delay of the guard time "b" required in switching from the reception mode to the transmission mode. After being handed off, the terminal returns to step 810 and continues to perform the normal data reception.

However, when the signal is not detected from the adjacent base station in step 818, the terminal goes to step 820 and searches for the adjacent base station for the leading half cycle of the next frame from which the guard time "b" required in switching from the base station transmission mode 2 (or terminal reception mode 2) to the base station reception mode 1 (or terminal reception mode 1) is subtracted. That is, in step 820, the actual time available for the adjacent base station search is S/2=T/2−b. After passage of the cycle S/2 for the adjacent base station search, the terminal receives the data for the following T/2 cycle after delay of the guard time "b" required in switching from the base station transmission mode 2 (or terminal reception mode 2) to the base station reception mode 1 (or terminal reception mode 1), in step 822. Here, the above-mentioned T/2 cycle corresponds to one frame cycle from which the cycle wasted in searching for the adjacent base station and the guard time "b" are subtracted. After completion of the data reception, the cellular terminal determined whether the adjacent base station is detected during step 820 (step 824). If it is determined in step 824 that the adjacent base station is detected, the terminal is handed off to the searched adjacent base station in step 826 and then returns to step 810 to perform the normal data reception.

Now, reference will be made to a handoff procedure according to another embodiment of the present invention with reference to FIGS. 9 to 11.

Figure 9:
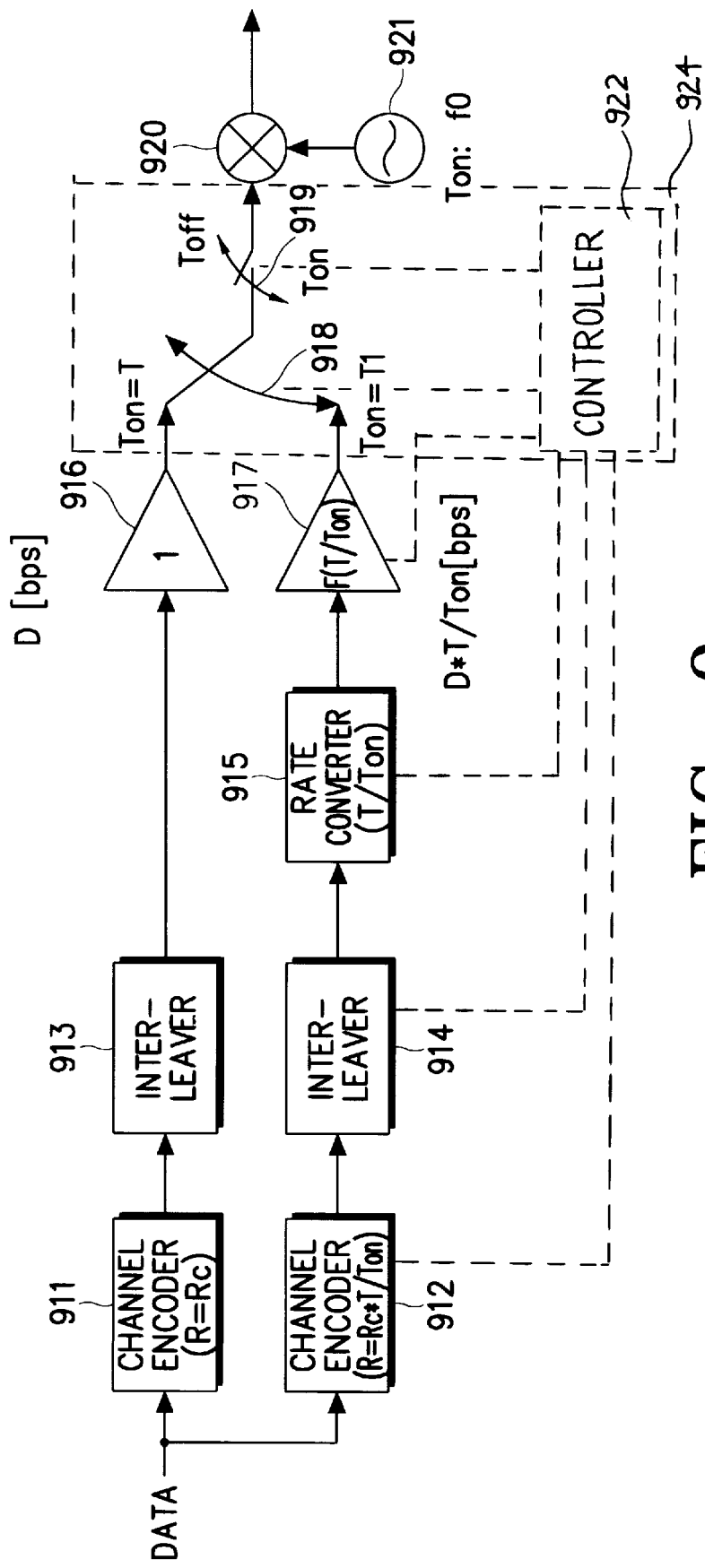
FIG. 9 is a schematic block diagram of a handoff scheme for the base station according to another embodiment of the present invention.
Figure 10:
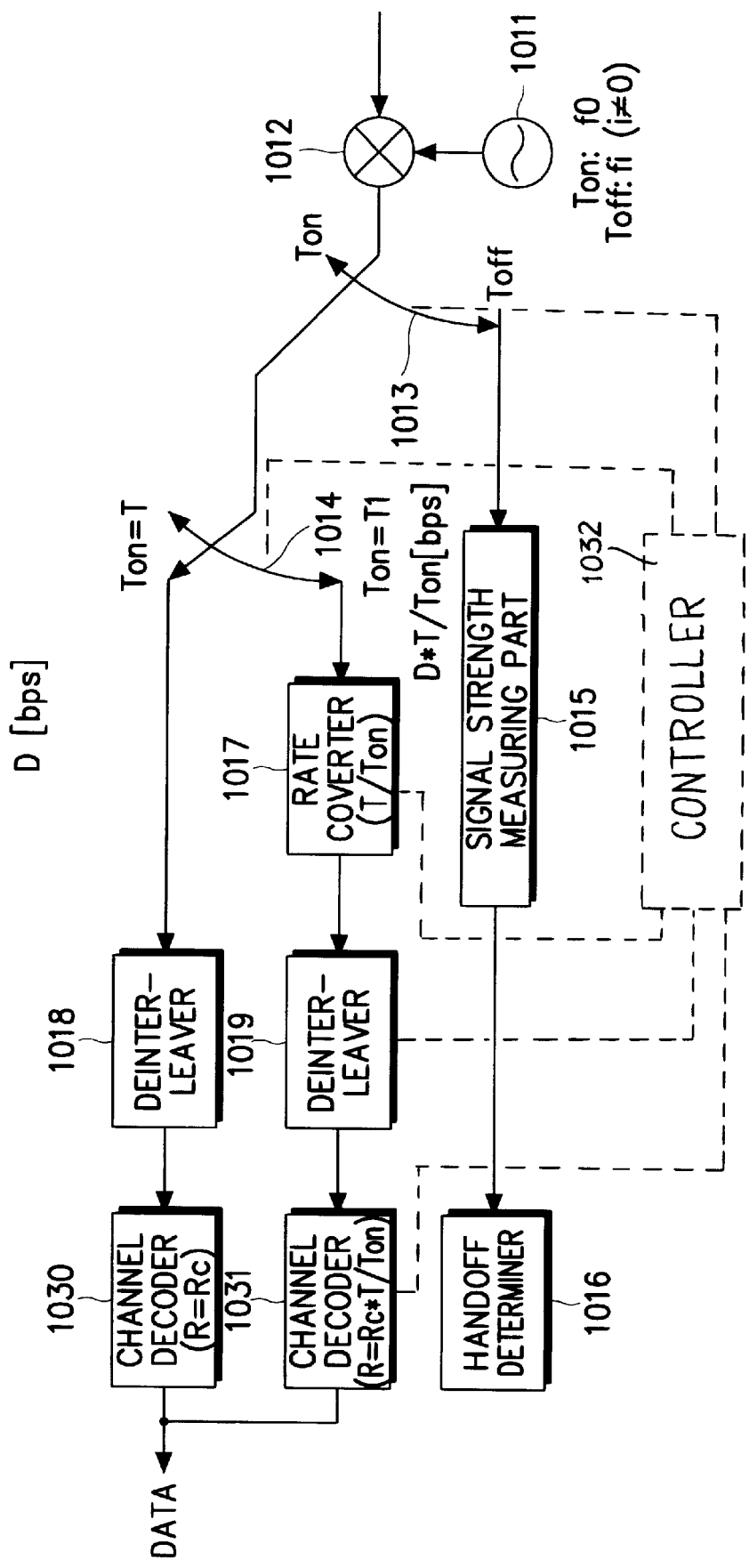
FIG. 10 is a schematic block diagram of a handoff scheme for the terminal according to another embodiment of the present invention.

FIGS. 9 and 10 illustrate a handoff scheme for the base station and a handoff scheme for the terminal according to another embodiment of the present invention, respectively.

Referring to FIG. 9, channel encoders 911 and 912 encode input data into symbol data at corresponding coding rates R=Rc and R=Rc*T/Ton, respectively. Interleavers 913 and 914 interleave the symbol data output from the channel encoders 911 and 912, respectively. A rate converter 915 converts (or increases) a data rate of the symbol data output from the interleaver 914 by T/Ton times. A first amplifier 916 amplifies the symbol data output from the interleaver 913 with a specific gain, and a second amplifier 917 amplifies the symbol data output from the rate converter 915 with a specific gain. Here, the gain of the second amplifier 917 is set higher than the gain of the first amplifier 916, in proportion to the converted data rate. This is to compensate for the bit error rate (BER) which may be caused by the increased data rate.

A first switch 918 is switched to the first amplifier 916 in the normal mode and to the second amplifier 917 in the handoff mode, under the control of a controller 922. That is, the first switch 918 transfers an output of the first amplifier 916 to a second switch 919 in the normal mode and an output of the second amplifier 917 to the second switch 919 in the handoff mode. In the normal operation mode, the second switch 919 is turned on (or closed) in the leading interval of the first frame and the following interval of the second frame. However, in the handoff mode, the second switch 919 is turned off (or opened) in the following interval of the first frame and the leading interval of the second frame. That is, under the control of the controller 922, the second switch 919 switches between the transmission interval and the non-transmission interval of the frame, during data transmission in the handoff mode, and is turned on only in the transmission interval to transfer the data from the first switch 918 to a modulator 920. The modulator 920 modulates the data from the second switch 919 by using a carrier wave f0 of the base station itself, generated from an oscillator 921, and radiates the modulated signal through a undepicted antenna. Here, the controller 922, the first switch 918 and the second switch 919 correspond to a controller 924 for controlling a transmission operation of the base station.

In the case that the mobile communication system is a CDMA communication system, a transmitter in the base station apparatus is composed of the channel encoder 912, the interleaver 914, the rate converter 915, the amplifier 917, and the modulator 920. Here, the rate converter 915 may include orthogonal modulation and PN sequence spreading, and the amplifier 917 may be a gain controller. Further, the controller 922 controls the channel encoder 912, the interleaver 914, the rate converter 915 and the amplifier 917, in the handoff mode. When the mobile communication system switches from the normal mode to the handoff mode, the controller 922 decreases the coding rate of the channel encoder 912 to be lower than that in the normal mode to decrease the number of the coded data symbols, and controls the interleaver 914 to interleave the decreased data symbols. Here, if the coding rate is decreased by ½, the symbol number of the frame data is also decreased by half, so that separate rate conversion is not required. When the rate conversion is required, the controller 922 uses a fast data transmission clock by controlling the rate converter 915, and controls the orthogonal modulation by using orthogonal codes of short length. In addition, the controller 922 increases the gain of the amplifier 917 in the data transmission interval (i.e., the first interval of the first frame and the second interval of the second frame) to provide a transmission power higher than that in the normal mode, and disables the amplifier 917 in the data non-transmission interval (i.e., the second interval of the first frame and the first interval of the second frame).

As can be appreciated from the foregoing descriptions, a method for converting the rate of the data transmitted in the first interval of the first frame and the second interval of the second frame can be divided into two methods. One is to perform the rate conversion as shown in FIG. 5 to transmit the frame data in the data transmission data, and another is to decrease the number of data symbols by decreasing the coding rate of the channel encoder as shown in FIG. 9. Further, it is also possible to use both of the two methods in order to set the data transmission interval to be longer than the data non-transmission interval.

Next, referring to FIG. 10, a mixer (or demodulator) 1012 demodulates a signal received via a undepicted antenna by using a carrier wave f0 or fi (where I≠0) of a corresponding base station, generated from an oscillator 1011. Specifically, when the signal is received from the present base station, the mixer 1012 demodulates the received signal using the carrier wave f0, and when the signal is received from the adjacent base station, the mixer 1012 demodulates the received signal using the carrier wave fi for the adjacent base station. A third switch 1013 switches, in sync with the second switch 919, an output signal of the mixer 1012 to a fourth switch 1014 in a frame data reception interval Ton (or transmission interval of the base station) and to a signal strength measuring part 1015 in a frame data non-reception interval Toff (or non-transmission interval of the base station). The signal strength measuring part 1015 measures the strength of the signal received from the adjacent base station in the non-transmission interval. A handoff determiner 1016 determines whether to perform the handoff operation depending upon the detected signal strength value of the adjacent base station, output from the signal strength measuring part 1015.

The fourth switch 1014 switches to the mode 0 or the mode 1 in sync with the first switch 918. Specifically, the fourth switch 1014 switches the data received from the third switch 1013 to a deinterleaver 1018 in a normal data reception mode (i.e., mode 0) and to a rate deconverter 1017 in a data reception mode (i.e., mode 1) for handoff. Here, the data switched to the deinterleaver 1018 has a normal data rate and the data switched to the rate deconverter 1017 has a data rate higher than that of the original data. The rate deconverter 1017 deconverts the data rate of the received data from the fourth switch 1014 to the original data rate. The deinterleaver 1018 deinterleaves the data received from the fourth switch 1014 and a deinterleaver 1019 deinterleaves the rate deconverted data output from the rate deconverter 1017. A channel decoder 1030 decodes an output of the deinterleaver 1018 at a decoding rate R=Rc and a channel decoder 1031 decodes an output of the deinterleaver 1019 at a decoding rate R=Rc*T/Ton.

In the case that the terminal apparatus (i.e., mobile station) of FIG. 10 is a CDMA terminal apparatus, a receiver in the terminal apparatus is composed of the demodulator 1012, the switch 1013, the rate deconverter 1017, the deinterleaver 1019, the channel decoder 1031, the signal strength measuring part 1015 and the handoff determiner 1016. The controller 1032 in the terminal controls the rate deconverter 1017, the switch 1013, the deinterleaver 1019 and the channel decoder 1031.

Figure 11:
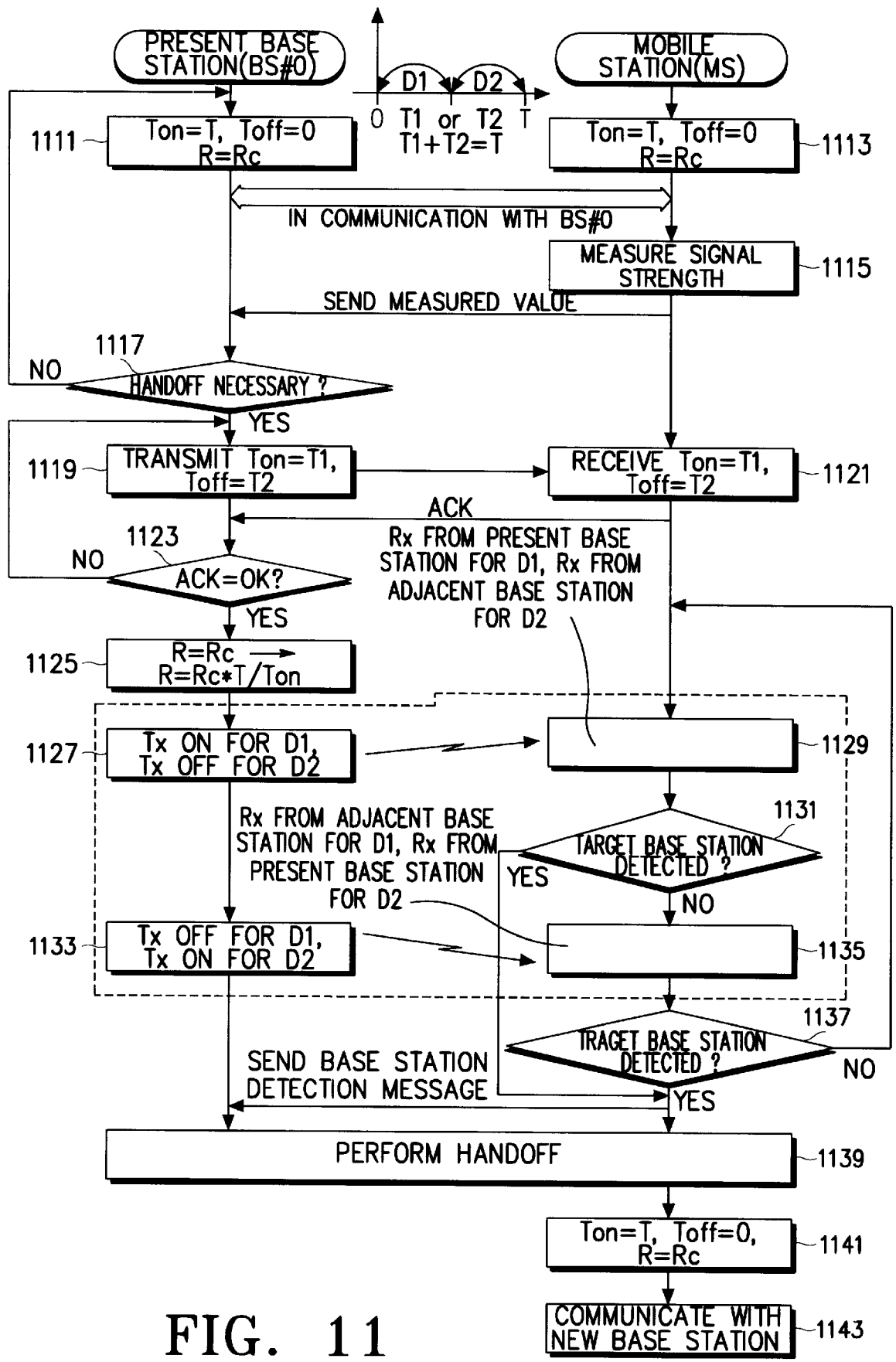
FIG. 11 is a flowchart illustrating a handoff procedure between the base station and the terminal according to another embodiment of the present invention.

FIG. 11 is a flowchart illustrating a handoff procedure between the base station and the terminal according to another embodiment of the present invention. Referring to FIG. 11, the present base station transmits the data for the whole frame cycle T (step 1011), and then the terminal receives the transmitted data for the whole frame cycle (step 1113). This operation corresponds to the mode 0 in which Ton=T, Toff=0 and R=Rc. In step 1115, the terminal measures the signal strength of the present base station and informs the base station of the measured signal strength value when it is lower than a threshold level. Depending on the detected signal strength value, the base station determines whether to perform the handoff (step 1117). When it is not necessary to perform the handoff, the base station returns to step 1111 and continues to transmit the data in the mode 0. Here, it is also possible that the terminal sends a handoff request message to the base station by measuring the strength of the received signal.

However, if it is necessary to perform the handoff, the base station proceeds to step 1119 to send the handoff parameters of Ton=T1, Toff=T2 and T1+T2=T to the terminal. The terminal then receives the handoff parameters in step 1121 and sends an acknowledge signal ACK. The base station checks whether the acknowledge signal ACK is received from the terminal (step 1123). When the acknowledge signal ACK is not received for a predetermined time, the base station returns to step 1119 to again send the handoff parameters. However, when the acknowledge signal ACK is received in step 1123, the base station proceeds to reset the channel coding rate R to Rc*T/Ton for handoff, where Rc is the coding rate for the mode 0, T is the frame cycle and Ton is the transmission time (step 1125).

Thereafter, the base station transmits the rate converted first frame data for the leading interval D1 [0, Ton] of the first frame (step 1127) and, the terminal receives the frame data in the leading interval D1 of the first frame (step 1129). The relation between the data transmission interval Ton and the base station transmission power (or terminal reception power) is represented by reference numeral 400 in FIG. 4, in which the transmission power is, as illustrated, increased by T/Ton times as compared with the case where the data is normally transmitted. In this case, although the number data symbols in the leading interval D1 [0,Ton] of the first frame is constant without regard to a change of the channel coding rate, the number of the data symbols available for the channel decoding and the interleaving effect are reduced. After receiving the data at the changed channel coding rate, the terminal measures the signal strength of the adjacent (target) base station for the Toff period in the following interval D2 [Ton, T] of the first frame in step 1131, to determine whether the handoff target base station is detected. Here, the terminal searches for the adjacent base station not for the whole Toff interval, but for an interval S=Toff−a, where "a" is the guard time required in switching from the mode 1 to the mode 2.

If the handoff target base station is detected, the terminal sends a base station detection message to the present base station and is handed off to the detected (target) base station in step 1139. However, when the handoff target base station is not detected, the terminal proceeds to step 1135. In the meantime, when the present base station does not receive the base sation detection message for a predetermined time after transmission of the first frame data, it stops transmitting the data for the time Toff in the leading interval D1 [T, T+Toff] of the second frame succeeding to the first frame and instead, transmits the second frame data for the time Ton in the following interval D2 [T+Toff, 2T] (step 1133). The terminal then receives the second frame data in step 1135, and checks, in step 1137, whether the handoff target base station is detected by measuring the signal strength of the adjacent base station for the Toff time in the leading interval D1, being the non-transmission interval [T, T+Toff], of the second frame. Here, the terminal searches for the adjacent base station not for the whole Toff time, but for the time Toff−b, where "b" denotes the guard time required in switching from the mode 2 to the mode 1. That is, in step 1137, the actual time available for the adjacent base station search is Toff−b. In the meantime, when the terminal detects the handoff target base station, it sends the base station detection message to the present base station and is handed off to the adjacent base station in step 1139. However, when the terminal fails to detect the handoff target base station, it returns to step 1129 to receive the next (i.e., second) frame data. After sending the base station detection message, the terminal resets the parameters to Ton=T and Toff=0 for the normal mode (step 1141) and communicates with the new base station in step 1143.

As described above, the actual search time available for the adjacent base station search and the relation between the base station transmission power (or terminal reception power) and the channel coding rates in respective modes are well illustrated in FIG. 4. As a result, as illustrated in FIG. 4, the actual search time available for the adjacent base station search is 2Toff−a−b which is shorter by a+b than the conventional search time 2Toff−2a−2b. That is to say, the terminal searches for the adjacent base station for the consecutive intervals between Ton and T of the present (i.e., first) frame and between T and T+Toff of the next (i.e., second) frame. Accordingly, it is possible for the terminal to reduce, by half, the frequency of switching between the mode 2 (in which the terminal searches for the adjacent base station) and the mode 1 (in which the terminal receives the data), which increases the search time available for the base station search and decreases the load of the frequent mode switching.

Furthermore, in this embodiment, a symbol rate of the frame data is primarily reduced and the data rate is adjusted by using the reduced symbol rate, which decreases a load of adjusting the data rate. For example, if the data rate of the original data is 25 bps and the original channel coding rate is ¼, the symbol rate is 100 bps. Here, to increase the data rate by 2(T/Ton) times, the 100 bps data should be transmitted at a data rate of 200 bps, which causes a heavy load. However, if the channel coding rate is first adjusted to ½(¼*T/Ton) so as to provide the symbol rate 50 bps, the data rate of the transmission data is adjusted from 50 bps to 100 bps, so that the load may be reduced as compared with the above method.

As described above, in the novel handoff method, the data reception interval (or data transmission interval of the base station) changes with the search interval (or data non-transmission interval of the base station) during the handoff mode. Therefore, it is possible to increase the actual search time available for the adjacent base station search by the guard time required in switching the modes, thereby decreasing the mode switching load.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A base station apparatus in a mobile communication system comprising:

a transmitter for generating transmission data for a period of consecutive first and second frames; and a controller for dividing each of said first and second frames into a first interval and a second interval following the first interval, and controlling the transmitter to transmit respective frame data in the first interval of the first frame and the second interval of the second frame and to stop transmission of the data in the second interval of the first frame and the first interval of the second frame.

2. The base station apparatus as claimed in claim 1, wherein said transmitter further comprises a rate converter for converting a data rate of the frame data transmitted in the first interval of the first frame and the second interval of the second frame, so as to increase the data rate of the frame data.

3. The base station apparatus as claimed in claim 1, wherein said transmitter further comprises a channel encoder for encoding the transmission data in frame units by decreasing a coding rate in the first interval of the first frame and the second interval of the second frame.

4. The base station apparatus as claimed in claim 3, wherein said transmitter further comprises a rate converter for converting a data rate of the coded frame data to increase the data rate of the coded frame data.

5. The base station apparatus as claimed in claim 2, wherein said transmitter comprises an amplifier for increasing a transmission power of a transmission signal.

6. The base station apparatus as claimed in claim 3, wherein said transmitter comprises an amplifier for increasing a transmission power of a transmission signal.

7. The base station apparatus as claimed in claim 5, wherein each of the second interval of the first frame and the first interval of the second frame is a half cycle of one frame cycle.

8. The base station apparatus as claimed in claim 1, wherein said transmitter further comprises:

a channel encoder for encoding the frame data;

an interleaver for interleaving an output of the channel encoder;

a rate converter for increasing a data rate of data output from the interleaver; and an amplifier for amplifying a transmission power of a signal output from the rate converter with a gain higher than a gain for another mode.

9. The base station apparatus as claimed in claim 8, wherein said channel encoder decreases the number of data symbols of the frame by decreasing a coding rate.

10. A terminal apparatus in a mobile communication system, comprising:
- a receiver for receiving data for a period of consecutive first and second frames, each of said frames being divided into a first interval and a second interval following the first interval;
- a handoff determiner for determining a handoff target base station by analyzing a strength of the received signal; and
- a controller for applying to the receiver a signal transmitted from a base station presently in communication with the terminal in the first interval of the first frame and in the second interval of the second frame, and for applying to the handoff determiner signals transmitted from other base stations in the second interval of the first frame and the first interval of the second frame, in a handoff mode.

11. The terminal apparatus as claimed in claim 10, wherein said receiver comprises a rate deconverter for deconverting a data rate of the frame data received in the first interval of the first frame and the second interval of the second frame, so as to decrease the data rate of the frame data to a normal data rate.

12. The terminal apparatus as claimed in claim 10, wherein said receiver comprises a channel decoder for decoding coded data received in the first interval of the first frame and the second interval of the second frame at a decoding rate corresponding to a coding rate for the coded data.

13. The terminal apparatus as claimed in claim 10, wherein said receiver comprises:
- a rate deconverter for deconverting a data rate of the data received in the first interval of the first frame and the second interval of the second frame to a normal data rate; and
- a channel decoder for decoding the rate deconverted data at a decoding rate corresponding to a coding rate of a transmitter.

14. The terminal apparatus as claimed in claim 11, wherein each of the second interval of the first frame and the first interval of the second frame is a half cycle of one frame cycle.

15. The terminal apparatus as claimed in claim 12, wherein each of the second interval of the first frame and the first interval of the second frame is a half cycle of one frame cycle.

16. The terminal apparatus as claimed in claim 10, wherein said receiver comprises:
- a rate deconverter for deconverting the frame data to a normal data rate;
- a deinterleaver for deinterleaving the rate deconverted signal; and
- a decoder for decoding the deinterleaved signal at a decoding rate corresponding to a coding rate.

17. The terminal apparatus as claimed in claim 16, wherein said channel decoder decodes the received data at a decoding rate corresponding to a coding rate decreased by a channel encoder in the transmitter of the base station.

18. The terminal apparatus as claimed in claim 16, wherein said handoff determiner comprises:
- a signal strength measuring part for measuring a strength of the received signal to generate a signal strength value; and
- a handoff determining part for determining whether to perform a handoff operation in response to the signal strength value.

19. The terminal apparatus as claimed in claim 17, wherein said handoff determiner comprises:
- a signal strength measuring part for measuring a strength of the received signal to generate a signal strength value; and
- a handoff determining part for determining whether to perform a handoff operation in response to the signal strength value.

20. A handoff device of a mobile communication system, comprising:
- a base station apparatus comprising:
  - a transmitter for generating transmission data for a period of consecutive first and second frames;
  - a controller for dividing each of said first and second frames into a first interval and a second interval following the first interval, and for controlling said transmitter to transmit respective frame data in the first interval of the first frame and the second interval of the second frame and to stop transmission of the data in the second interval of the first frame and the first interval of the second frame; and
- a terminal apparatus comprising:
  - a receiver for receiving data for the period of consecutive first and second frames;
  - a handoff determiner for determining a handoff target base station by analyzing a strength of the received signal; and
  - a controller for applying a signal transmitted from a base station currently in communication with the terminal in the first interval of the first frame and the second interval of the second frame, and applying to the handoff determiner signals transmitted from other base stations in the second interval of the first frame and the first interval of the second frame, in a handoff mode.

21. The handoff device as claimed in claim 20, wherein said base station apparatus comprises a rate converter for converting a data rate of the frame data in the first interval of the first frame and a second interval of the second frame so as to increase the data rate, wherein said terminal apparatus comprises a rate deconverter for deconverting the data rate of the received data in the first interval of the first frame and the second interval of the second frame.

22. The handoff device as claimed in claim 20, wherein said base station apparatus comprises a channel encoder for decreasing a coding rate of the frame data to decrease the number of data symbols in the first interval of the first frame and the second interval of the second frame, wherein said terminal apparatus comprises a channel decoder for decoding the coded data received in the first interval of the first frame and the second interval of the second frame at a decoding rate corresponding to the coding rate of the channel encoder.

23. The handoff device as claimed in claim 20, wherein said base station apparatus comprises:
- a channel encoder for decreasing a coding rate of the frame data to decrease the number of data symbols; and
- a rate converter for converting the data rate of the coded data to increase the data rate, in the first interval of the first frame and the second interval of the second frame;
wherein said terminal apparatus comprises a rate deconverter for deconverting the data rate of the received data and a channel decoder for decoding the rate deconverted data at a decoding rate corresponding to the coding rate of the channel encoder, in the first interval of the first frame and the second interval of the second frame.

24. The handoff device as claimed in claim 21, wherein said base station apparatus comprises an amplifier for amplifying a transmission power of the signal transmitted in the first interval of the first frame and the second interval of the second frame.

25. The handoff device as claimed in claim 21, wherein each of the second interval of the first frame and the first interval of the second frame is a half cycle of one frame cycle.

26. A transmission method during a handoff mode in a base station of a mobile communication system which transmits data in frame units, the transmission method comprising the steps of:

preparing consecutive first and second frames;

dividing each of the first and second frames into a first interval and a second interval following the first interval; and transmitting respective frame data in the first interval of the first frame and the second interval of the second frame and preventing transmission of the data in the second interval of the first frame and the first interval of the second frame.

27. The transmission method as claimed in claim 26, further comprising the step of converting the frame data transmitted in the first interval of the first frame and the second interval of the second frame to data having a data rate higher than a data rate in a normal mode.

28. The transmission method as claimed in claim 26, further comprising the step of encoding the frame data in the first interval of the first frame and the second interval of the second frame at a coding rate lower than a coding rate in a normal mode, so as to decrease the number of data symbols.

29. The transmission method as claimed in claim 26, further comprising the steps of:

encoding the frame data in the first interval of the first frame and the second interval of the second frame at a coding rate lower than a coding rate in a normal mode, so as to decrease the number of data symbols; and transmitting the encoding frame data at a data rate higher than a data rate in a normal mode.

30. The transmission method as claimed in claim 28, wherein a transmission power of the transmission data is higher than a data transmission power in the normal mode.

31. The transmission method as claimed in claim 29, wherein a transmission power of the transmission data is higher than a data transmission power in the normal mode.

32. The transmission method as claimed in claim 30, wherein each of the second interval of the first frame and the first interval of the second frame is a half cycle of one frame cycle.

33. The transmission method as claimed in claim 26, further comprising the step of transmitting handoff parameters from the base station to the terminal for setting the first interval of the first frame and the second interval of the second frame to a data transmission interval and for setting the second interval of the first frame and the first interval of the second frame to a data non-transmission interval, wherein said step of transmitting is performed when a handoff operation must be performed during communication with a terminal.

34. The transmission method as claimed in claim 26, further comprising the steps of:

handing off the terminal to a detected handoff target base station when the present base station received a handoff target base station detection message from the terminal after passage of the first and second frames; and repeating a handoff procedure of the first and second frames when the handoff base station detection message is not received from the terminal.

35. The transmission method as claimed in claim 33, further comprising the steps of:

handing off the terminal to a detected handoff target base station when the present base station received a handoff target base station detection message from the terminal after passage of the first and second frames; and repeating a handoff procedure of the first and second frames when the handoff base station detection message is not received from the terminal.

36. The transmission method as claimed in claim 34, further comprising the steps of:

analyzing a strength of the signal transmitted from the terminal in the base station; and switching to the handoff mode when the signal strength is lower than a threshold level.

37. The transmission method as claimed in claim 30, further comprising the step of switching to the handoff mode in the base station in response to a handoff request message from the terminal.

38. A receiving method in a terminal of a mobile communication system during a handoff mode, the method comprising the steps of:

receiving data transmitted from a base station presently in communication with the terminal in a first interval of a first frame and a second interval of a second frame; and receiving signals transmitted from other base stations in a second interval of the first frame and a first interval of the second frame.

39. The receiving method as claimed in claim 38, further comprising the step of deconverting the data received in the first interval of the first frame and the second interval of the second frame to a data rate in a normal mode.

40. The receiving method as claimed in claim 38, further comprising the step of decoding coded data received in the first interval of the first frame and the second interval of the second frame at a decoding rate corresponding to a coding rate of the coded data.

41. The receiving method as claimed in claim 38, farther comprising the steps of:

deconverting a data rate of the data received in the first interval of the first frame and the second interval of the second frame to a normal data rate; and decoding the rate deconverted data at a decoding rate corresponding to a coding rate of a transmitter.

42. The receiving method as claimed in claim 39, wherein each of the second interval of the first frame and the first interval of the second frame is a half cycle of one frame cycle.

43. The receiving method as claimed in claim 40, wherein each of the second interval of the first frame and the first interval of the second frame is a half cycle of one frame cycle.

44. The receiving method as claimed in claim 38, further comprising the step of receiving handoff parameters from the base station for setting the first interval of the first frame and the second interval of the second frame to a data transmission interval and for setting the second interval of the first frame and the first interval of the second frame to a data non-transmission interval, wherein said step of transmitting is performed when a handoff operation must be performed during communication with the base station.

45. The receiving method as claimed in claim 38, further comprising the step of transmitting a handoff target base station detection message from the terminal to the present base station upon detection of a handoff target base station after passage of the first and second frames.

46. The receiving method as claimed in claim 44, further comprising the step of transmitting a handoff target base station detection message from the terminal to the present base station upon detection of a handoff target base station after passage of the first and second frames.

47. The receiving method as claimed in claim 45, further comprising the steps of:
analyzing a strength of the signal received from the base station to inform the base station of the signal strength if the signal strength is lower than a threshold level; and
switching to a handoff mode in response to a handoff request message from the base station.

48. The receiving method as claimed in claim 45, further comprising the steps of:
analyzing a strength of the signal received from the base station to transmit a handoff request message to the base station if the signal strength is lower than a threshold level; and
switching to a handoff mode upon reception of a response from the base station.

49. A handoff method in a mobile communication system preparing consecutive first and second frames each divided into a first interval and a second interval succeeding the first interval and transmitting data in frame units, the handoff method comprising the steps of:
transmitting frame data in the first interval of the first frame from a base station to a terminal;
preventing, in the base station, transmission of the frame data in the second interval of the first frame and the first interval of the second frame;
receiving, in the terminal, signals transmitted from other base stations to search for a base station to which the terminal is to be handed off; and
transmitting frame data in the second interval of the second frame from the base station to the terminal.

50. The handoff method as claimed in claim 49, further comprising the steps of:
converting a data rate of the data transmitted in the first interval of the first frame and the second interval of the second frame to increase the data rate, said step of converting being performed by the base station; and
deconverting, at the terminal, the rate converted data received in the first interval of the first frame and the second interval of the second frame.

51. The handoff method as claimed in claim 49, further comprising the steps of:
decreasing a coding rate of the frame data transmitted in the first interval of the first frame and the second interval of the second frame to decrease the number of data symbols, said step of decreasing being performed by the base station; and
decoding, at the terminal, the data received in the first interval of the first frame and the second interval of the second frame at a decoding rate corresponding to a coding rate of the received data.

52. The handoff method as claimed in claim 49, further comprising the steps of:
decreasing a coding rate of the frame data transmitted in the first interval of the first frame and the second interval of the second frame to decrease the number of data symbols;
converting a data rate of the coded data to increase the data rate, said steps of decreasing and converting being performed by the base station, deconverting, at the terminal, the rate converted data received in the first interval of the first frame and the second interval of the second frame; and
decoding, at the terminal, the received data at a decoding rate corresponding to the coding rate of the coded data.

53. The handoff method as claimed in claim 50, further comprising the step of said base station increasing a transmission power of a signal in the first interval of the first frame and the second interval of the second frame.

54. The handoff method as claimed in claim 51, further comprising the step of said base station increasing a transmission power of a signal in the first interval of the first frame and the second interval of the second frame.

55. The handoff method as claimed in claim 53, wherein each of the second interval of the first frame and the first interval of the second frame is a half cycle of one frame cycle.

56. The handoff method as claimed in claim 49, further comprising the step of receiving handoff parameters from the base station for setting the first interval of the first frame and the second interval of the second frame to a data transmission interval and for setting the second interval of the first frame and the first interval of the second frame to a data non-transmission interval, wherein said step of transmitting is performed by the base station when a handoff operation must be performed during communication with the terminal.

57. The handoff method as claimed in claim 49, further comprising the steps of:
receiving a signal from a handoff target base station after passage of the first and second frames;
informing the base station of the detection of the handoff target base station upon receipt of the same; and
repeating the transmission and non-transmission intervals of the first and second frames when the signal from the handoff target base station is not received.

58. The handoff method as claimed in claim 56, further comprising the steps of:
receiving a signal from a handoff target base station after passage of the first and second frames;
informing the base station of the detection of the handoff target base station upon receipt of the same; and
repeating the transmission and non-transmission intervals of the first and second frames when the signal from the handoff target base station is not received.

59. The handoff method as claimed in claim 57, further comprising the steps of:
analyzing, in the terminal, the strength of the received signal; and
switching to a handoff mode when the signal strength is lower than a threshold level.

60. The handoff method as claimed in claim 57, further comprising the steps of:
measuring, in the terminal, the strength of a received signal; and
transmitting a received signal strength value to the base station when the measured signal strength is lower than a threshold level, wherein said base station sets a handoff mode in response to the received signal strength value from the terminal.

61. A handoff method in a mobile communication system preparing consecutive first and second frames each divided into a first interval and a second interval succeeding the first interval and transmitting data in frame unit, the handoff method comprising the steps of:

transmitting, to a terminal, handoff parameters for setting the first interval of the first frame and the second interval of the second frame to a data transmission interval and setting the second interval of the first frame and the first interval of the second frame to a data non-transmission interval, said step of transmitting being performed when it is necessary to perform a handoff operation while a base station communicates with the terminal;

transmitting frame data in the first interval of the first frame from the base station to the terminal;

preventing, in the base station, transmission of the frame data in the second interval of the first frame;

receiving, in the terminal, signals transmitted from other base stations in the second interval of the first frame to search for a handoff target base station;

transmitting a handoff target base station detection message from the terminal to the base station upon detection of a handoff target base station;

preventing, in the base station, transmission of the frame data in the first interval of the second frame when the handoff target base station is not detected;

receiving, in the terminal, signals transmitted from other base stations to search for a base station to which the terminal is to be handed off;

transmitting frame data in the second interval of the second frame from the base station to the terminal;

transmitting a handoff target base station detection message to the base station upon detection of the handoff target base station and performing a handoff procedure; and repeating the handoff procedure of the first and second frames when the handoff target base station is not detected.

62. A handoff device in a mobile communication system, comprising:

a base station apparatus comprising;
  a first transmitter for transmitting frame data in a normal mode;
  a second transmitter having a rate converter for converting a data rate to increase the data rate, for transmitting the frame data in a handoff mode;
  a controller for transmitting the frame data of the first transmitter in the normal mode, having consecutive first and second frames each divided into a first interval and a second interval following the first interval, said controller transmitting respective frame data in the first interval of the first frame and the second interval of the second frame and preventing transmission of the data in the second interval of the first frame and the first interval of the second frame;

a terminal apparatus comprising;
  a receiver for processing received data;
  a handoff determiner for analyzing a strength of the received signal to determine a handoff target base station; and
  a controller for applying, to the receiver, a signal transmitted from a present base station in the first interval of the first frame and the second interval of the second frame and applying, to the handoff determiner, a signal transmitted from other base stations in the second interval of the first frame and the first interval of the second frame.

* * * * *